April 13, 1943.　　　W. C. OCKER ET AL　　　2,316,181
PRE-FLIGHT REFLEX AND GUNNERY TRAINER
Filed Sept. 10, 1941　　　4 Sheets-Sheet 2
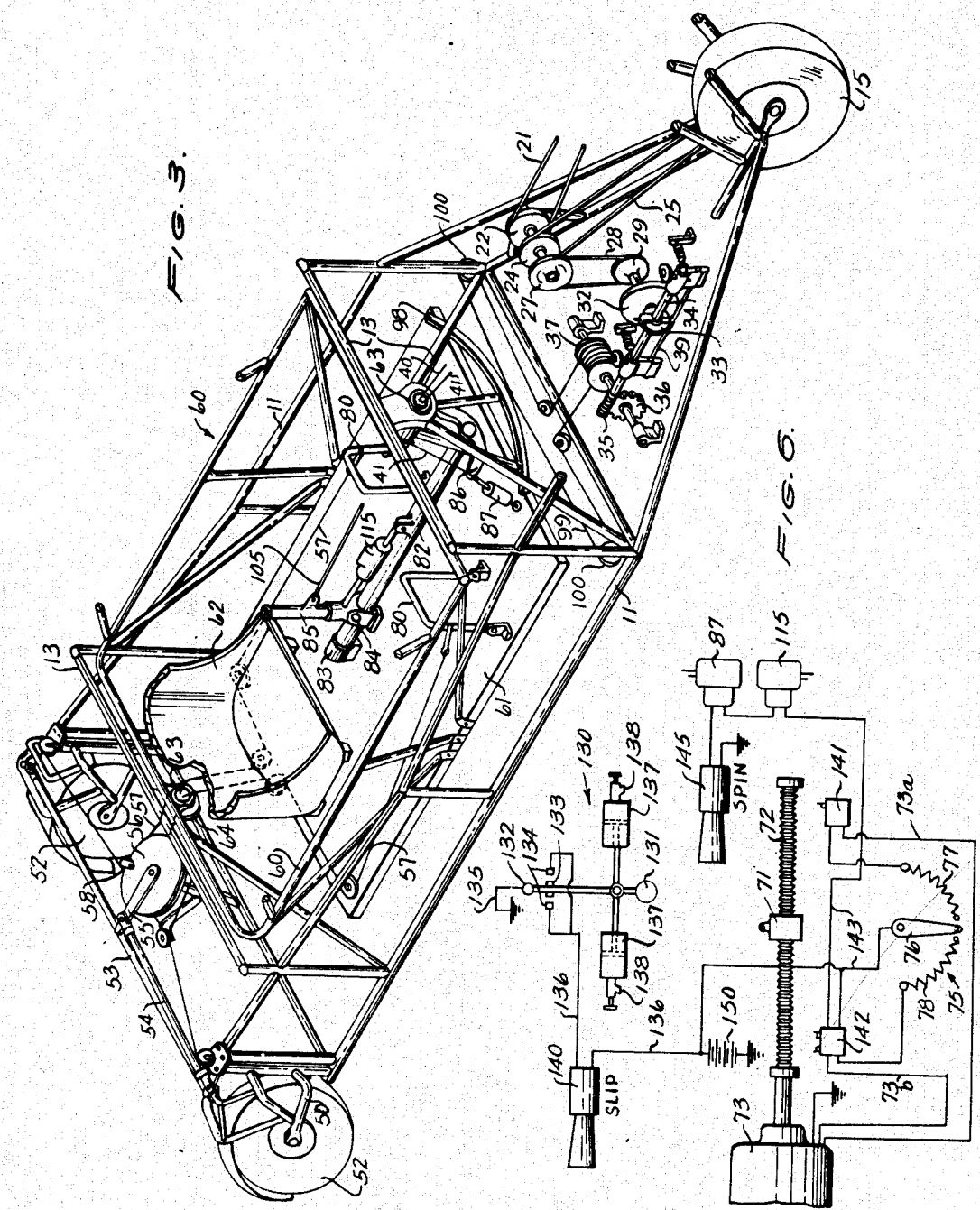

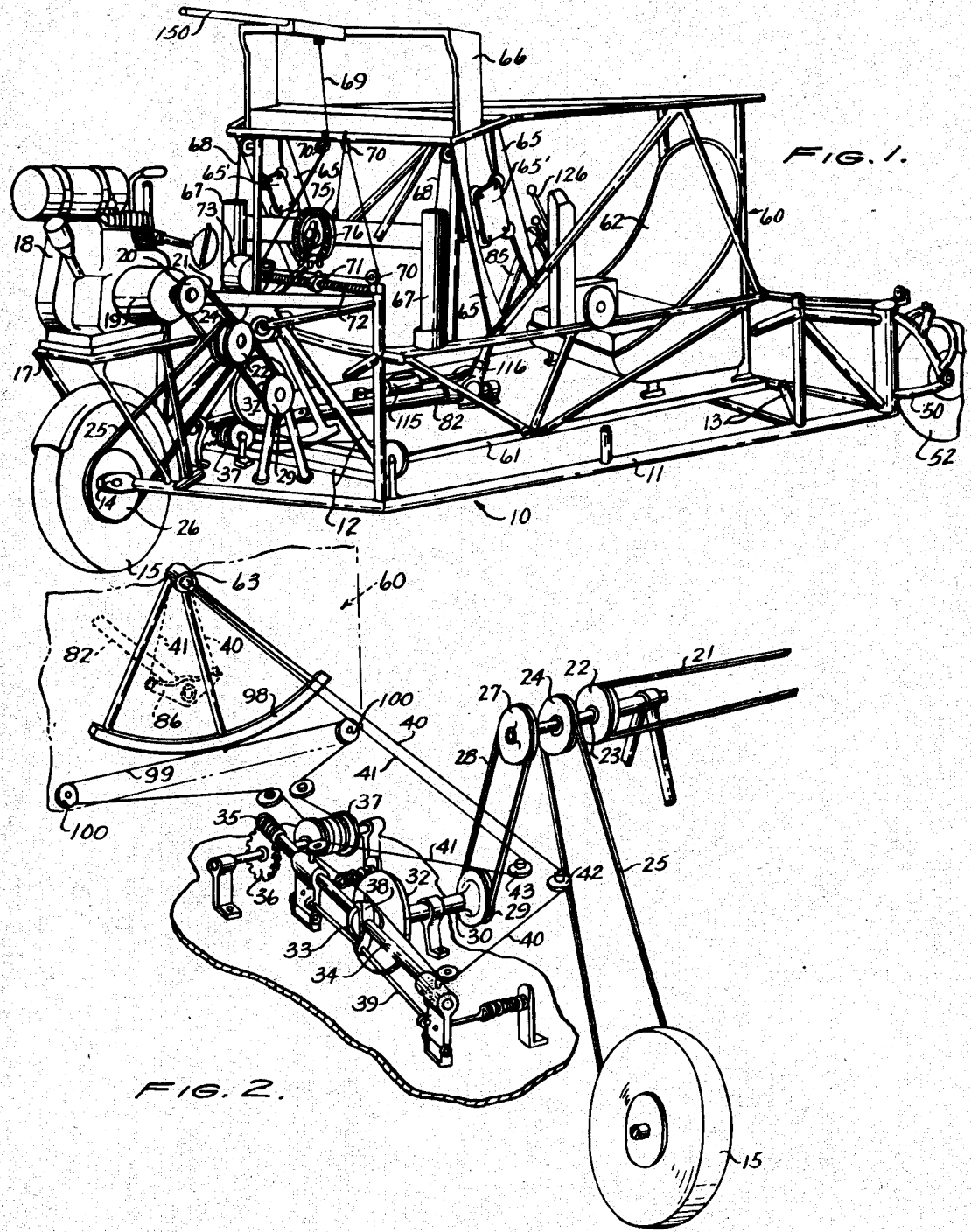

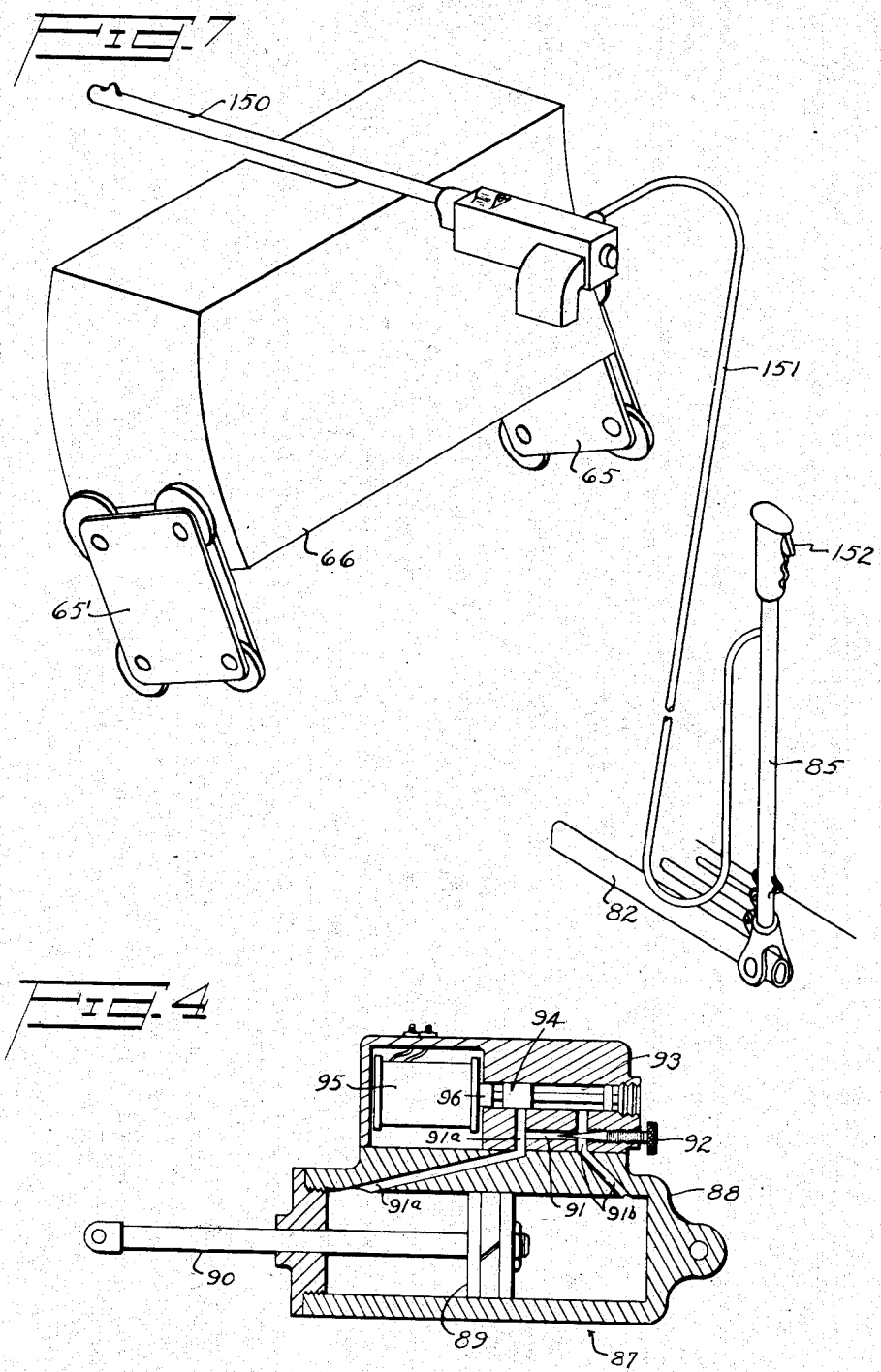

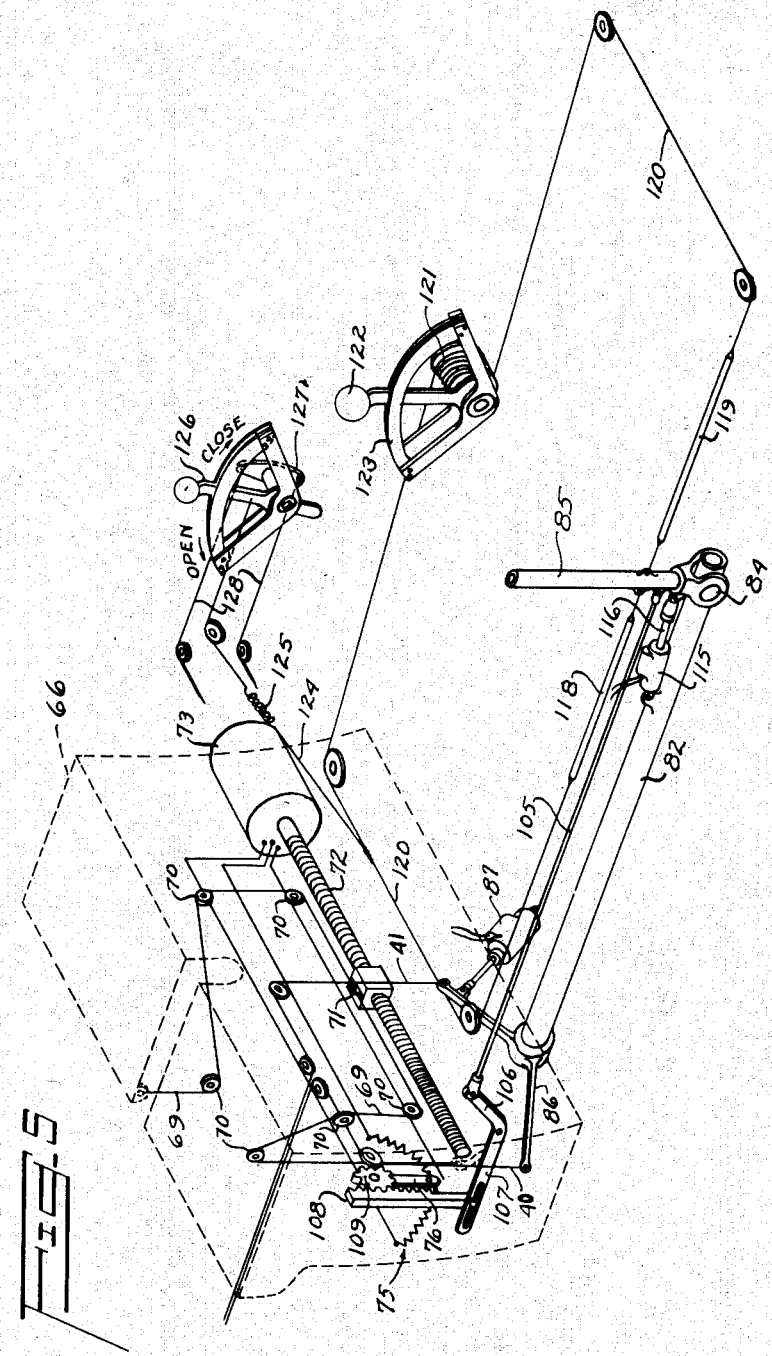

Patented Apr. 13, 1943

2,316,181

UNITED STATES PATENT OFFICE 2,316,181

PREFLIGHT REFLEX AND GUNNERY TRAINER

William C. Ocker, Baltimore, Md., and Carl J. Crane, Barksdale Field, La.

Application September 10, 1941, Serial No. 410,318

19 Claims. (Cl. 35—12)

(Granted under the act of March 3, 1883, as amended April 30, 1928; 370 O. G. 757)

The invention described herein may be manufactured and used by or for Government for governmental purposes, without the payment to us of any royalty thereon.

This invention relates to ground training apparatus for giving primary instruction in the art of flying an airplane and is designed to condition the physiological and psychological reflexes of the student to such an extent that the dual instruction time in an actual airplane may be considerably lessened, thus conserving the valuable time of a flight instructor.

The learning of the coordinating movement of the controls of an airplane to spacially orientate the same is acquired by conditioning the physiological reflexes of the student by constant repetition of the controls until the action becomes automatic. This conditioning of the reflexes consumes much valuable instructor's time when carried out in the usual dual place training airplane and often results in discovering that the student has no aptitude for flying after considerable instruction time has been expended. The second stage of learning to fly as noted is concerned with the control of the aircraft to traverse a desired course and requires the training of the psychological reflexes, such as the evaluations of situations and required actions to be taken when a given situation presents itself such as in the event some obstacle is encountered without forewarning and in which physiological and psychological reactions will be involved.

So far as we are aware there is in use no ground vehicle or trainer which is capable of use in training the prospective flying student in both the spacial orientation of an aircraft and directional control of the same to avoid obstacles, to thereby give the necessary conditioning of the physiological and psychological reflexes as outlined above, in the manner as accomplished by the present invention.

In accordance with the present invention there is provided an aviation ground trainer comprising a power propelled vehicle having supporting wheels, the rear wheel or wheels thereof being steerable by the student through the medium of rudder pedals or the like, and having a sub-frame forming a cockpit inclosure with a seat for the student and including a set of controls duplicating the usual rudder and stick or wheel type controls employed in an airplane. The sub-frame is mounted in bearings for tilting about the longitudinal axis of the vehicle and actuated by power means controlled by the stick or wheel control so as to cause the sub-frame to tilt to simulate the banking of an airplane under the action of the ailerons. The sub-frame is also provided with a nose or cowl section which is movable up and down by power means under the control of the fore and aft movements of the control stick or its equivalent to simulate the nosing up or down of an airplane. The design of the power actuated means for respectively causing the lateral tilting of the sub-frame and the vertical shifting of the nose or cowl section is such, that a given lateral, or fore and aft motion of the control column respectively, will cause a proportionate tilting of the sub-frame or shifting of the cowl section respectively, at a rate proportional to the movement of the control column, and the return of the control column to the neutral position will leave the sub-frame tilted to simulate bank, or leave the shiftable cowl section in a position to represent a nosing up or down of an airplane, and in order to return the sub-frame and shiftable cowl section to the normal level position, opposite control column movements must be applied by the student exactly as in restoring an airplane to the level flight position.

The trainer is also provided with signal means which indicate by aural signals the improper banking of the cockpit enclosure for the particular rate of turn of the trainer and also to warn of the approach of the shiftable cowl section to an angle corresponding to the stalled position of an aircraft. The stall warning system is also connected to a pair of solenoid controlled dashpots connected to the control column to render the dashpots inoperative to impose any resistance to the operation of the control column and thus simulates the feeling of lack of control response which accompanies a stall.

In order to simulate the air loads imposed on an aircraft control column due to change in throttle setting and the neutralizing of such loads by adjustment of the trimming gear resilient means are provided operable with the engine throttle control to impose a load which is felt on the control column and other means resembling the stabilizer adjustment gear of an airplane are provided for neutralizing such loads.

A ground trainer in accordance with the invention also serves as an excellent medium in giving preliminary training in gunnery such as the operation of fixed type aircraft machine guns. This is accomplished by mounting a .22 caliber atomatic rifle, which may be a standard commercial gun modified to give full automatic action, on the movable cowl or nose section of the cockpit inclosure and providing a wire pull type of control extending from the gun to the control column and terminating in a trigger which may be depressed to actuate the trigger mechanism on the gun to cause the same to be fired. A tortuous course to be steered may be laid out on the firing range by means of stakes or the like and suitable targets placed at different elevations with respect to the level line of sight from the trainer, the targets being so arranged that the student will have a direct aim thereon only for a brief period of time, thus in effect simulating the firing at an enemy aircraft. The low caliber practice type of machine gun may be employed in place of the automatic rifle and the latter term is intended to embrace both types of arms.

It is therefore the principal object of the invention to provide an aviation ground trainer for teaching a student the art of controlling an aircraft, comprising a power propelled wheeled vehicle adapted to be steerably controlled by the student occupant in a manner similar to the directional control of an aircraft and so arranged as to simulate the banking and nosing up or down flight attitudes of an aircraft under the control of the student, whereby the physiological and to some degree the psychological reactions of the student are conditioned prior to actual flight instruction.

It is another object of the invention to provide an aviation ground trainer comprising a power propelled steerable wheeled vehicle having means forming a cockpit inclosure for the student receiving instruction, and the cockpit being laterally tiltably mounted thereon, said cockpit inclosure being provided with means shiftable in a plane normal to the tilting movement thereof to simulate the nosing up or down of an airplane during flight, controls being mounted within said cockpit inclosure duplicating the controls of an airplane, the said controls being operative upon actuation by the student to respectively steer the vehicle, cause a lateral tilting of the cockpit, or cause an upward or downward displacement of said shiftable means.

Another object of the invention is the provision in aviation ground training apparatus of the character described, of aural signalling means for signalling the improper use of the controls, the control column further being provided with yielding resistance means normally opposing movement of the control means and the signalling system being operative to render the resistance means ineffective to thereby simulate loss of control when the trainer simulates the stalled flight condition of an airplane.

It is another object of the invention to provide in aviation ground training apparatus of the type comprising a power propelled steerable wheeled vehicle, said vehicle having means for simulating the banking attitude of an airplane and other means for simulating the nosing up or down attitudes of said aircraft, control means duplicating the cockpit controls of an airplane and effective to steer the vehicle and to actuate the bank and pitch simulating means respectively; of an automatic rifle or machine gun mounted on and movable with the means for simulating the nosing up or nosing down or pitching movement of an airplane and adapted to be fired at targets remote from the trainer and means associated with the control means for controlling the firing of the rifle or machine gun.

Other objects of the invention not specifically enumerated above will become apparent by reference to the detailed description in the specification and to the appended drawings in which:

Fig. 1 is a perspective view illustrating the general assembly of the principal component parts of the invention, and;

Fig. 2 is a top perspective view illustrating details of the vehicle drive and power take-off mechanism, and;

Fig. 3 is a perspective view illustrating details of the trainer disclosed in Fig. 1, including the lateral and directional control system, and;

Fig. 4 is a view partly in section illustrating the construction of a solenoid controlled dashpot employed in the trainer control system, and;

Fig. 5 is a schematic view illustrating the details of the control system for causing simulated changes in elevation and also schematically illustrating the simulated trim tab or stabilizer adjustment, and;

Fig. 6 is a diagrammatic illustration of the signal system employed in conjunction with the trainer control, and;

Fig. 7 is a fragmentary perspective view of an automatic rifle or low caliber machine gun as employed on the trainer for gunnery practice.

Referring now to Fig. 1, the reference numeral 10 generally indicates the main frame of the trainer, which is trapezoidal in plan form and comprises two identical spaced side frames 11 made of seamless steel tubing, or the like, united by welding, the side frames 11 being spaced by means of front transverse frame members 12 and rear transverse frame members 13. The front portion of the side frames 11 taper inward and terminate in wheel fork fittings 14, which serve to rotatably journal a rubber tired vehicle wheel 15, the wheel 15 being non-steerable and serving as a drive wheel to propel the trainer over the ground. A mounting base 17 is provided immediately over the front wheel 15 and is suitably supported by tubular bracing members from the frames 11 and serves as a mounting for a conventional type single cylinder internal combustion engine 18, which is preferably of the 4-cycle type controlled by a manually regulated throttle valve (not shown). The engine 18 is adapted to transmit its power through a mercury, or other type of speed responsive coupling 19, such that the full motor torque is not delivered to the driving side of the coupling until the engine speed exceeds a predetermined amount, couplings of this character being well known in the art and commercially available. The drive shaft of the coupling 19 is provided with a driving pulley 20, which through the medium of a V-belt 21 is adapted to drive a similar pulley 22 mounted on the outer end of a countershaft 23 suitably supported in bearings (not shown) carried by the main frame 10. As seen in Fig. 2, the countershaft 23 is also provided with a pulley 24 which by means of a V-belt 25 is adapted to drive a large pulley 26 (Fig. 1) rigidly secured to the hub of the driving wheel 15 and is rotatable therewith, the pulley 26 serving to transmit the drive from the engine 18 to propel the trainer.

As seen in Fig. 2, the countershaft 23 is also provided with a pulley 27 which, by means of a V-belt 28, is adapted to drive a pulley 29 mounted on the jackshaft 30, the latter being suitably supported in bearings (not shown) mounted on the trainer frame 10. At its outer end the jackshaft 30 is provided with a friction disc 32 which serves as a power take-off means for utilizing a portion of the power output of the engine 18 to energize servo mechanism as will be hereinafter described.

The friction disc 32 is adapted to co-operate with a friction roller 33 which is slidably keyed on a shaft 34 to drive the same, the shaft 34 being provided at its outer end with a worm 35. The friction roller 33 is provided with a shifting fork 38 which is slidably mounted on a guide member 39 and adapted to shift the friction roller 33 radially in either direction from the center of the friction disc 32, thus causing the roller and the shaft 34 to be driven in either of two directions at a speed proportional to the radial distance of the friction roller 33 from the center of the friction disc 32. The shifting fork 38 has connected therewith on one side a control cable 40 adapted to shift the fork 38 and roller 33 axially along the shaft 34 to the left, as seen in Fig. 2, and a similar control cable 41, connected to the opposite side of the shifting fork 38, is operative to cause a shifting of the friction roller radially with respect to the friction disc 32 in the opposite direction, the control cables 40 and 41 passing over suitable guide pulleys 42 and 43 respectively and adapted to be connected to a stick control mechanism, hereinafter more fully described.

As seen in Figs. 2 and 3, the previously mentioned worm 35 mounted on the shaft 34 and driven by the friction roller 33 meshes with a worm wheel 36 so as to rotate the same in either direction in accordance with the direction of rotation of the shaft 34, the gear 36 being adapted to drive a cable drum 37 integrally connected thereto, the cable drum 37 serving in the lateral control system of the trainer in a manner later described.

Referring to Figs. 1 and 3, the side frames 11 forming the main frame 10 are each provided at the rear end with a vertically pivoted castered wheel fork 50, each of which serves to journal a rubber tired wheel 52 similar to the driving wheel 15 of the trainer. As seen in Fig. 3, the wheel forks 50 are interconnected by means of a pivoted radius bar 53 and adapted to be jointly rotated about their pivotal axes by means of forces transmitted through a steering link 54 pivotally connected at one end to the radius rod 53 and at its other end to be suitably pivotally connected to a steering arm 55, the latter being rigidly secured to and rotatable with a pulley 56 suitably mounted on the frame 10 by means (not shown) for rotation about an axis parallel with the pivotal axes of the wheel forks 50. The pulley 56 is adapted to be angularly rotated about its pivotal axis by means of a cable 57 which is securely clamped at one point to the pulley 56 by means of a well-known type of cable clamp, indicated at 58.

Again referring to Figs. 1 and 3, the reference numeral 60 generally indicates a sub-frame or platform constructed of welded steel tubing and provided with a floor 61 and a seat 62 for the student occupant of the trainer. The sub-frame 60 is adapted to be suitably covered by removable sections of artificial leather, or the like, (not shown) to provide a cockpit inclosure simulating the cockpit of a conventional airplane. The sub-frame 60, hereinafter also referred to as the cockpit inclosure, is provided with longitudinally extending hollow pivots 63 which are adapted to be journaled in suitable bearings 64 (Fig. 3) mounted on the transverse frame members 12 and 13 respectively to support the cockpit inclosure for lateral tilting movement in either direction relative to the longitudinal axis of the trainer main frame 10. As seen in Fig. 1, the cockpit inclosure, or sub-frame 60, is provided with pairs of arcuate guide members 65 which are similarly mounted on each side of the cockpit inclosure and serve as guides, or tracks, for wheeled carriages 65', each of which is rigidly secured to a shiftable cowling or front deck portion of the cockpit inclosure, the top of the shiftable cowling section 66 serving as a reference line with respect to the visible horizon to simulate the nosing up or nosing down of an actual airplane relative to the horizon. The center of curvature of the arcuate guide members 65 is so selected and arranged that it coincides with a transverse axis passing through the eyes of the student occupant of the trainer, to thus cause a shifting of the movable cowling section 66 in a manner to give a true simulation of the change in attitude of the nose and front cowling of an airplane as the same is caused to move relative to the visible horizon by actuation of the airplane longitudinal control. The weight of the shiftable cowling section 66 and wheeled carriages 65' is counterbalanced by suitable weights carried within the tubular guides 67 and connected to the shiftable cowling section 66 by means of cables 68, or the like. The terminal ends of a cable 69 are secured to the shiftable cowling section 66 at spaced points and the cable 69 is led over suitable guide pulleys 70, secured to the sub-frame 60, and the mid portion of the cable is secured to a traveling nut or carriage 71 mounted on and adapted to be shifted by a lead screw 72, also supported by the sub-frame 60. The lead screw 72 is adapted to be driven in the forward or reverse directions of rotation by means of a small direct-current type reversible electric motor 73 of the split field type, which may be controlled by means of a rheostat 75 having independent portions thereof connected in series with the split field coils of the motor 73 to cause the same to run in a desired direction and at a speed dependent upon the position of a contact arm 76, which is rotated by means of the trainer control system, as will be hereinafter described. The motor 73 in driving the lead screw 72 causes a feeding motion of the nut 71 in either direction from the middle position and thereby causes the cable 69 to elevate or depress the shiftable cowling section 66 from a neutral or level position.

Directional control system

Referring to Fig. 3, the floor 61 of the cockpit inclosure 60 is seen to have pivotally mounted thereon a pair of rudder pedals 80 which are adapted to be actuated by the feet of the student in the same manner as the conventional rudder pedals in an airplane. The rudder pedals 80 are respectively connected to the terminal ends of the cable 57 which, passing over suitable guide pulleys, projects through the rear hollow pivot bearing 63 of the cockpit inclosure and passes around the pulley 56 as previously described, the cable being secured to the pulley, as noted, by the cable clamp 58. By depressing either of the rudder pedals 80 the pulley 56 is rotated about its axis, causing the steering arm 55 to shift the steering link 54 and through the radius rod 53 to cause a rotation of the castered wheel forks 50 about their pivotal axis either to the right or the left, as the case might be, the depressions of the left rudder pedal causing a turning of the vehicle to the left, and, similarly, a depression of the right rudder pedal causing a turning of the vehicle in the corresponding direction. Suitable restraining means, such as shock cords connected to the castered wheel forks 50 and not shown, are provided for preventing excessive turning or unstable action of the rear wheels of the trainer. It is thus seen that by actuation of the rudder pedals 80 the student occupant of the trainer may steer the same in a desired course in exactly the same manner as an airplane is directionally controlled in a plane parallel to the surface of the earth.

Lateral control

A means for controlling the lateral tilting of the cockpit inclosure 60 to thereby simulate the banking of an airplane under the action of aileron control will now be described. Referring to Fig. 3, the cockpit inclosure 60 is seen to be provided with a rockshaft 82 suitably journaled in bearings 83, only one of which is shown, supported by the floor member 61 of the cockpit inclosure, so that the rockshaft 82 may be rotated about a longitudinal axis. The rockshaft 82 is provided with a transverse bearing member 84 upon which is mounted the forked lower end of a conventional airplane-type control column or stick 85, the stick being capable of being moved fore and aft about the bearings 84 and of being displaced laterally to cause rotation of the rockshaft 82. A double armed lever 86 is mounted on the front end of the rockshaft and has its arms respectively connected to the control of cables 40 and 41 which, as previously noted, are adapted to shift the friction roller 33 of the power takeoff mechanism drivably associated with the trainer propulsion power plant 18. Cables 40 and 41 are arranged to pass through the hollow front pivot of the cockpit inclosure so that tilting movement of the same will not affect the control. One of the arms of the double armed lever 86 is also connected to the piston rod of a two-way oil dashpot 87, which is illustrated in detail in Fig. 4, and as there seen, comprises a closed cylinder 88 adapted to be filled with oil and having a piston 89 slidably mounted therein, the piston being connected to the piston rod 90 which passes through one end of the cylinder 88 in sealing relation thereto.

The cylinder 88 has fluid passageways 91a and 91b communicating with opposite ends thereof respectively, the passageways being interconnected by means of a by-pass channel 91, the flow through which, in either direction, is restricted by means of an adjustable needle valve 92. At their outer ends the passages 91a and 91b communicate with a plugged bore 93 formed in a valve casing forming part of the cylinder 88. The communication of the passage 91a with the bore 93 is controlled by a pressure balanced spool type piston valve 94 having one of its head portions normally in the position as shown in Figure 4 blocking the communication between the said passage 91a and the bore 93. An electrical solenoid 95 has a spring loaded plunger 96 connected to the valve 94 and when the solenoid is energized the plunger pulls the valve axially to the left from the position shown in Figure 4. When the valve 94 is in the position as shown in Figure 4 all flow of fluid from one side of piston 89 to the other must pass through the restricted passage 91 and the resistance then offered by the dashpot 87 resists the lateral motion of the control column 85 with a magnitude depending upon the rate of deflection of the control column, thus simulating the aileron loads felt on an airplane control column when performing rapid maneuvers. When the valve 94 is moved by solenoid 95 to the left from the position shown in Figure 4 due to the solenoid being energized, a free flow of fluid is permitted through the bore 93 from either of the passages 91a and 91b to thereby cut out substantially all of the resistance of the dashpot to lateral motion of the control column, thus simulating the lack of feel of load on an airplane control column when approaching a stall. The solenoid is adapted to be actuated in conjunction with a signal system as will be later described.

Referring again to Fig. 3, the cockpit inclosure 60 is seen to be provided with an arcuate guide member 98 rigidly secured thereto and which is adapted to be connected at its center point with an endless cable 99 which passes over guide pulleys 100 fixed to the trainer frame 10, the cable 99 also being wound around and secured at one point to the cable drum 37, previously described above with reference to the power take-off and friction drive elements 30, 32, etcetera. Lateral movement of the control column 85 in either direction will cause a corresponding rotation of the rockshaft 82 and double armed lever 86 which will cause either cable 40 or 41 to be tensioned to cause a shifting of the shift fork 38 and friction roller 33 relative to the friction disc 32 to cause as best illustrated in Fig. 2 a rotation of the friction roller and shaft 34 in a given direction and at a velocity proportional to the magnitude of the shifting of the friction roller 33, which will, of course, be proportional to the angular rotation of the control column 85 from its neutral position. The rotation of the shaft 34 through the worm 35 and worm wheel 36 will cause a rotation of the cable drum 37 to cause a motion of the cable 99 in one or the other direction and the motion of the cable will cause a corresponding tilting movement of the cockpit inclosure 60 through the means of the arcuate guide 98 secured thereto. If, after having deflected the control column in either direction laterally from its neutral position, the control column is rapidly returned to the neutral position, the friction roller 33 will be correspondingly rapidly shifted until it is centrally disposed with respect to the friction disc 32, at which time further driving of the friction roller 33 by the disc 32 will stop, thus leaving the cockpit inclosure 60 tilted in either direction about the longitudinal axis of the trainer in any desired amount between certain predetermined limits, which may be determined by means of suitable stop members (not shown). This feature of the lateral control thus causes the control of the tilt of the cockpit inclosure 60 to exactly duplicate the conditions present when controlling the lateral inclination of an aircraft, for example when making a turn. Since the control stick in the airplane is moved laterally from the neutral position until a desired amount of lateral inclination or banking of the airplane has been secured, and the stick is then returned to the neutral position, leaving the airplane inclined with respect to the horizon and in order to return the aircraft to the level flight position it is necessary to apply opposite control, that is, move the control stick in the opposite direction until the aircraft is again level, when the stick is then returned to the neutral position, and a similar control must be effected in the present training device in order to return the cockpit inclosure from a banked position to the normal simulated level flight position. It is thus seen that the student occupant, by lateral movement of the control column 85 may exactly duplicate the similar lateral control of an airplane through the medium of the control stick, or the like. It is to be understood, however, that the lateral motion of the control column 85 may be replaced by the conventional wheel type control, it only being necessary in such a case that the friction roller control cables 40 and 41 be alternately tensioned to cause a displacement of the friction roller in opposite directions as the control wheel is rotated in a clockwise or counter-clockwise direction respectively. It is also to be understood that in place of the friction drive servo mechanism employed to cause tilting of the cockpit inclosure 60, a hydraulic or electric servo mechanism may be employed, the friction drive type of servo mechanism being illustrated because of its simplicity and the fact that no separate power source or complicated pump or motor mechanisms need be employed.

Longitudinal control

In order to simulate the change in the attitude of the longitudinal axis of an aircraft, or referred to above as the nosing up or down of an airplane, the shiftable cowl section 66 of the cockpit inclosure, positionally controlled through the medium of the reversible electric servo motor 73 (as seen in Fig. 1) is employed, and in order to control positioning of the shiftable cowl section, the control column (as seen in Fig. 5) has connected thereto a longitudinal extending push rod 105 universally pivoted at its outer end to one arm 106 of a bell crank lever pivotally mounted for movement in a longitudinal plane, the other arm 107 of which is pivotally connected to a rack 108 which reciprocates in a vertical plane and causes rotation of a gear 109 which is adapted to be secured to the shaft for actuating the contact blade 76 of the rheostat 75, which as previously noted in the description of Fig. 1, is adapted to control the reversible electric motor 73. As the control column 85 is moved in a fore and aft direction from a neutral position, the push rod 105 and bell crank arms 106 and 107 are operative through the rack 108 to cause a rotation of gear 109 and the contact arm 76 of the rheostat 75 to cause the contact arm to move from a neutral position to engage either of a pair of resistance segments 77 or 78 (see Fig. 6) respectively, connected in series with the field terminals 73a and 73b of the reversible electric motor 73.

Again, as seen in Fig. 6, the current from a storage battery, or the like, 150, may be conducted through the contact blade 76 to either of the field conductors 73a or 73b through the respective resistances 77 or 78 causing the motor 73 to run in either of two directions with a speed dependent upon the magnitude of the angular rotation of the rheostat blade 76 from its neutral or dead position.

Again referring to Fig. 5, it will be seen that since the angular position of the rheostat contact blade 76 is dependent upon the longitudinal deflection of the control column 85 from its neutral position, the rate of elevation or depression of the shiftable cowl section 66 from its neutral position will be proportional to the fore or aft deflection of the control column similar to the change in the longitudinal attitude of an aircraft in proportion to the change in the elevator setting. If, after moving the control column 85 in either a fore or aft direction, the control column is returned to the neutral position, the shiftable cowl section 66 will remain in either an elevated or depressed position dependent upon the magnitude of the control column deflection and the time during which such deflection was maintained, and in order to restore the shiftable cowl section to the neutral position an opposite movement of the control column 85 must be made, thus identically simulating the longitudinal control of an actual airplane by actuation of the control column. When the student sitting in the trainer actuates the control column 85 in a fore or aft direction, the line of sight from the student's eyes across the top of the shiftable cowl section 66 is altered with respect to the visible horizon in exactly the same manner as if the student when flying in an aircraft, caused the nose of the aircraft to be elevated or depressed with reference to the horizon. In order to simulate the feel of the air loads from an airplane elevator, the control column 85 has connected therewith a second solenoid controlled dashpot 115 identical in construction with the dashpot 87 illustrated in Fig. 4 and previously described. The dashpot 115 is normally operative to offer a restraint to the fore and aft motion of the control column in proportion to the rate of movement thereof and is adapted to be rendered ineffective by the actuation of the solenoid valve control thereof which co-operates with a signal system later described.

Trim tab or stabilizer control

Since most aircraft are provided with means to adjust the trim of an aircraft, that is, its balanced condition when the elevator control is released, and accomplished generally by adjustment of an adjustable stabilizer, or by shifting the position of a trimming tab mounted, for example, on the airplane elevators, it is desirable to simulate such a trimming control in a ground trainer and such a control is also illustrated in Fig. 5, in which the control column 85 is seen as having connected therewith a pair of resilient elements, such as lengths of elastic shock cord 118 and 119, connected on opposite sides of the control column at the inner ends thereof, each of the resilient elements 118 and 119 having their outer ends connected to an endless cable 120, which after passing over guide pulleys is wound around and secured to a rotatable cable drum 121, the latter being actuated by means of a lever 122, simulating the trimming adjustment lever provided on an airplane. The lever 122 is adapted to be held in any adjusted position by means of a notched sector plate, or the like, 123, co-operating with a detent, or the like, provided on the lever 122. As the lever 122 is moved in either direction from its neutral position the drum 121 will be correspondingly rotated to tension either of the resilient elements 118 or 119 to impose a loading force on the control column 85 which simulates either a nose-heavy or tail-heavy force, such as is felt on a control column in an aircraft when the same is not in longitudinal balance, and accordingly, by actuation of the lever 122, the student may apply forces to the control column to cause a balancing so that when the control column is in the neutral position no restraining force thereon is felt, this operation thus simulating the adjustment of the stabilizer or other trimming gear when flying an airplane, and in the case of the trainer the instructor may position the lever 122 so that forces are imposed upon the control column equivalent either to a nose-heavy condition or tail-heavy condition, as he desires, thereby forcing the student to set the trimming adjustment in the proper position in order to neutralize any forces on the control stick when the same is in the neutral position.

Since most airplanes are so designed such that when the throttle is closed to cut off the engine power, the airplane is slightly nose-heavy, so as to assume a proper gliding angle when the power is cut off. This condition is simulated in the present ground trainer by connecting the engine throttle control to the trim tab adjusting mechanism above described (illustrated in Fig. 5). The cable 124 is secured at one end to the endless cable 120 and at its other end is secured to an engine throttle control lever 126, suitably pivotally mounted on a bracket in the cockpit inclosure 60. The cable 124 has inserted in series therewith a spring or other resilient means 125 so that the throttle control lever when moved in a closing direction will tension the spring 125 and through the cable 124 will transmit a force to the cable 120, and the resilient element 118, so as to impose a force on the control column 85 resembling the nose-heavy condition in an airplane. The throttle control lever 126, as shown, is provided with a double arm lever 127, which is adapted, by means of cables 128, to actuate the throttle of the engine 18 of Fig. 1, the throttle not being shown, since the same is well known in the art. As the throttle lever 126 is moved to the open position the cable 124 and spring 125 become slack so that no restraining forces are introduced from the throttle control onto the control column 85.

*Signal system*

In order to force the student in the trainer to simultaneously bank the cockpit inclosure 60 the proper amount to correspond to a given rate of turn of the trainer, simulating the co-ordination of rudder and aileron controls in an airplane, a signal system is employed, as disclosed in Fig. 6, which comprises a pendulum inclinometer, generally indicated by the reference numeral 130, which is adapted to be mounted on the instrument board of the cockpit inclosure and responsive to outwardly directed centrifugal or acceleration forces, caused by the turning of the trainer. The inclinometer 130 comprises a pendulum 131 pivotally mounted at its upper end by means of a bearing 132, which is secured to the instrument board of the trainer so that the pendulum may rotate about an axis parallel to the longitudinal axis of the trainer. The pendulum 131 is provided with an electrical contact 133 which may engage either of a pair of adjustable contacts 134 located on opposite sides thereof and having a predetermined clearance from the pendulum contact 133. The pendulum contact 133 is electrically connected to the battery 150 through a grounded conductor 135 and the contacts 134 are connected by means of a conductor 136 to the positive terminal of the battery 150, the conductor 136 having a conventional electric signal, such as a horn 140, connected in series therewith. The lateral motion of the pendulum 131, due to acceleration forces arising from turning of the trainer, is opposed by a pair of dashpots 137 which have their piston rods pivotally connected to the pendulum and the damping influence of the dashpots 137 being controlled by adjustable needle control valves 138. The signal control system thus far described is so operative that if the student fails to cause a tilt or simulated bank of the cockpit inclosure 60 when making a turn, the acceleration force due to the turn will exceed the gravity force acting on the pendulum bob and cause the pendulum 131 to move so as to engage the contact 133 with either of the spaced contacts 134 to cause the signal horn 140 to be energized and thus announce to an observing instructor the improper co-ordination of the lateral and directional controls. This signal system thus at all times forces the student when turning the trainer to apply sufficient lateral control to maintain the pendulum 131 in substantially its central position so that the contact 133 is out of engagement with either of the contacts 134, and failure of the student to properly co-ordinate the lateral control with the directional control of the trainer, after considerable practice, indicates that the student will probably never successfully learn the necessary control co-ordination of an airplane and, consequently, further instruction may be eliminated.

As seen in Fig. 6, the field conductors 73a and 73b are connected in series with the respective resistance elements 77 and 78 by means of limit switches 141 and 142 respectively, which switches are adapted to de-energize the motor 73 whenever the nut 71 which actuates the shiftable cowl section 66 in Fig. 1 has traveled along the lead screw 72 to either of its limiting positions, whereby it engages either of the respective switches 141 or 142. The limit switch 142 is of the double pole type and having a separate switch connected by means of the conductor 143 to the positive terminal of the battery 150 and serially connected to the solenoid controlled dashpots 87 and 115, previously described, and thence is serially connected to an electric signal horn 145 and to the return side of the battery 150 through a grounded connection. When the traveling nut 71 approaches the first switch of the double pole switch 142, and corresponding to an elevation of the line of sight across the top of the shiftable cowling section 66 of Fig. 1, amounting to approximately 16 degrees, the electric circuit through the conductor 143 is completed and the solenoid control valves in the dashpots 87 and 115 are energized to release the restraining influence of the dashpots on the movement of the control column 85 in both the fore and aft and lateral directions and simultaneously causes the emission of a signal from the horn 145. The release of the restraining influence of the dashpots 87 and 115 causes the same effect as the sloppy control present in an aircraft when the same approaches a stalled condition and the sounding of a signal from the horn 145 is a warning to the student that the simulated elevation of the nose of the aircraft is approaching a stalled position and that a spin is imminent. If the control column 85 is not returned to the neutral position and a further elevation of the shiftable cowl section 66 occurs, the traveling nut 71 will finally engage the limit switch arm of the switch 142 to de-energize the motor 73 and stop a further elevation of the shiftable cowl section. Since the present trainer is primarily concerned with instructing the student in the use of the controls of an airplane to maintain the same in level flight and not in the performance of acrobatic maneuvers, which, of course, occur only at an advanced stage in the actual flight instruction on an airplane, the signal system, including the dashpots 87 and 115 and the signal horn 145, clearly simulate the condition of actual flight wherein the nose of the aircraft is allowed to inadvertently rise until the wings have reached their stalling angle, a very frequent occurrence with student pilots who tend to concern themselves mainly with the use of the rudder and lateral control and forget about the longitudinal controls, and the emission of a signal from the horn 145 is a clear warning to the student of the improper co-ordination of the longitudinal control with the lateral or directional control.

General operation

Though the operation of the individual components of the trainer have been discussed above, a brief recapitulation of the operation of the trainer as a whole will now be described. Upon entering the trainer cockpit 60, the engine 18 having been previously started, the student will operate the control stick 85 so as to place the cockpit inclosure 60 in the lateral level position and will move the control stick in a fore and aft direction such as to position the shiftable cowling section 66 on a line with the visible horizon and the engine throttle is then opened to cause the trainer to be gradually accelerated, until a speed of approximately 15 miles per hour is reached. The student then must adjust the trimming balance of the trainer by neutralizing any forces on the control column when the same is in the neutral position, by actuation of the control lever 122, described with reference to Fig. 5, with the exception of the slightly nose-heavy load imposed upon the control stick until the engine throttle control lever 126 is moved from the closed position, and the trainer is then caused to traverse any predetermined course as previously instructed by the supervising instructor.

The student controls the directional heading of the trainer, as previously noted, by actuation of the rudder pedals 80 (Fig. 3), and due to the provision of the signal system, including the inclinometer 130 and the signal horn 140 (Fig. 6), the student must so position the cockpit inclosure 60 so as to assume an angle of bank properly corelated to the existing rate of turn of the trainer, that is, the sharper the turn, the greater the angle of bank which must be applied and in case the student either over-banks or under-banks the cockpit inclosure while turning, the signal system will announce to the observing instructor the failure to co-ordinate the lateral control with the directional control of the trainer and, similarly, if the student allows the cockpit inclosure to be tilted unconsciously without turning, the signal horn 140 will also be sounded to indicate side slip or skidding. While the student is attempting to properly co-relate the lateral bank of the cockpit inclosure and directionally control the trainer to steer a desired course, his attention must also be constantly directed to maintaining the elevation of the shiftable cowl section 66 so that the line of sight across the cowl section intersects with the visible horizon, accomplished, as previously noted, by proper movement of the control column 85 in the fore and aft direction and should the student unconsciously, due to bumps and the like actuate the control column 85 so that the shiftable cowl section 66 moves to a position above the horizon, corresponding to the stall angle of a conventional airplane, the feel of the control stick will then become sloppy, due to the absence of any resistance offered by the dashpots 87 and 115, as noted with reference to Fig. 6, and the signal horn 145 will emit a warning signal indicating the approach of the stalled flight condition. It is thus seen that in control of the trainer the student's psychological reflexes are conditioned by the necessity of properly co-ordinating the directional and lateral control and since on even comparatively smooth terrain bumps will cause an unconscious actuation of the control column in the longitudinal control direction, the student must also continually watch the level of the shiftable cowl section relative to the horizon, thus co-ordinating this control with the lateral and directional controls.

After learning to orientate the trainer similar to learning to spatially orientate an airplane, the student may be required to cause the trainer to traverse prescribed courses presenting obstacles which must be avoided, and this type of operation will to a certain degree train the psychological reflexes of the student since in addition to the control of the trainer to simulate the spatial orientation of an aircraft, the student must exercise judgment in evaluating situations such as presented by obstacles in the path of the trainer, to determine the necessary change in course to avoid the obstacle and thus becomes used to making the rapid mental decisions so necessary to safely pilot an airplane.

The above described trainer has the virtue that it may be employed at locations such as colleges and preparatory schools where flying fields and training aircraft are not available and serves also as a means for rapidly determining with a minimum of expense those students who show an aptitude for flying and who may then be instructed in a minimum of time on actual aircraft at a training center.

Use of trainer for gunnery practice

Since the trainer in accordance with the present invention is provided with controls whereby both the lateral, longitudinal and directional control of an airplane may be simulated, and also the trainer may be caused to steer any desired course over the ground, the trainer adapts itself very well in instructing students on the ground in the use of fixed type machine guns such as provided on combat aircraft and to carry out such instruction the trainer is provided, as indicated in Figs. 1 and 7, with a gun 150 mounted on the shiftable cowl section 66 so as to be movable therewith. This gun may be a conventional semi-automatic rifle, re-worked in a well-known manner for full automatic operation, and employing, for example, .22 caliber ammunition, or the gun may be a low caliber type of machine gun such as used in practice by infantry troops, the particular type of gun being immaterial so long as the gun may be caused to fire a plurality of rounds of ammunition by actuation of the trigger mechanism thereof, which, as seen in Fig. 7, is connected by means of a flexible push-pull control 151 to a trigger actuating lever 152 mounted on a control column 85 and similar to the machine gun control provided in actual combat airplanes. In use, the trainer may be caused to traverse a tortuous course laid out on the firing range by means of guide stakes or the like and suitable targets may be positioned at various points along the course, such that a target is in point blank range only for a brief instant before the trainer must be turned, or otherwise steered away from the same, and also the level of the target with reference to the normal level line of sight from the student's eyes across the cowling section 66 to the horizon may be so adjusted that the student is required to control the elevation of the gun simultaneously with the directional and lateral control of the trainer, thus simulating the actual firing upon a maneuvering enemy aircraft.

In the invention as illustrated in the drawings the shiftable cowl section rotatable about an axis substantially coincident with the student's eyes is employed to simulate the angle made by the longitudinal axis of the airplane relative to the visible horizon because this structure is mechanically simple to construct and operate but it is obvious that the cockpit inclosure including its bearing supports, may be cradled in transverse bearings from the main frame so that the entire inclosure may be tilted in a longitudinal plane, separate electric servo motors, such as used for moving the shiftable cowl section, being employed for causing both the lateral and longitudinal tilting of the cockpit inclosure.

Although a preferred embodiment of the invention has been illustrated and described, other modifications and alterations therein will become apparent to those skilled in the art as falling within the scope of the invention.

We claim:

1. A power propelled vehicle for instructing students in the art of controlling an airplane including a main frame, supporting wheels for the frame, a power drive associated with at least one of the wheels for propelling the vehicle, at least one of said wheels being steerable for directionally controlling the vehicle and mounted at the rear of said frame, a platform having a seat thereon for the student occupant of the trainer and forming a cockpit inclosure, said platform being pivotally mounted on said main frame for lateral tilting with respect to the longitudinal axis of the main frame, reversible power actuated servo mechanism mounted on said vehicle and operatively connected to said platform to cause a tilting of the same in either direction about its pivotal axis, control means for said servo mechanism operative upon a displacement thereof from the neutral position in either direction to cause operation of said servo mechanism in a corresponding direction, a set of airplane-type control elements mounted on said platform and including controls simulating the rudder and lateral control means of an airplane, a connection between said simulated rudder control means and the directional control means of the trainer whereby the student may directionally control the trainer to traverse a desired course, and an operative connection between the simulated lateral control means and the control means for said servo mechanism whereby the student may cause a lateral tilting of said platform to simulate the lateral control of an airplane.

2. The structure as claimed in claim 1, including means operatively associated with said platform and shiftable to alter the line of sight of the student relative to the visible horizon to simulate the nosing up or down of an airplane, reversible power means for actuating said shiftable means, a control element for said power means operative upon movement thereof in either direction from a neutral position to cause said power means to actuate said shiftable means in a corresponding direction, one of said airplane-type control elements simulating the elevator control of an airplane and an operative connection between said one control element and the control element for said power means.

3. The structure as claimed in claim 1, including a lateral inclinometer mounted within the cockpit inclosure and responsive to lateral tilting of said platform and to acceleration forces due to turning of the trainer, and an electric signal controlled by said inclinometer and operative to emit an aural signal whenever said platform is tilted without turning the trainer in a corresponding direction and when the said platform is not tilted the proper amount for a given rate of turn of the trainer.

4. A power propelled vehicle for instructing students in the art of controlling an airplane said vehicle including steering means, a means forming a cockpit inclosure for the student pivotally mounted on the vehicle for lateral tilting to simulate the bank of an airplane, power means for tilting said cockpit inclosure, power actuated means associated with said cockpit inclosure and operative to simulate the change in position of the longitudinal axis of an airplane with respect to the horizontal, a set of airplane type directional, lateral and longitudinal controls within said cockpit inclosure and operative upon manual actuation thereof respectively to actuate the vehicle steering means, control the lateral tilting of said cockpit inclosure and to control said power actuated means to simulate a change in the position of the longitudinal axis of said airplane relative to the visible horizon, actuation of the lateral and longitudinal controls in either direction from a neutral position causing a corresponding control effect in a corresponding direction only at a rate proportional to the magnitude of the displacement of the lateral and longitudinal controls respectively.

5. The structure as claimed in claim 4, including a lateral inclinometer and a signal means controlled thereby, said inclinometer being responsive to lateral tilting of the cockpit inclosure and centrifugal force due to turning of the trainer, movement of the sensitive element of the inclinometer in either direction from a neutral position causing said signal means to give a warning signal.

6. The structure as claimed in claim 4, including a signal means operative in response to movement of said power actuated means beyond a predetermined point from a neutral position to give a warning signal to the trainer occupant.

7. The structure as claimed in claim 4, including a first signal system responsive to lateral tilting of the cockpit inclosure and to centrifugal force caused by turning of the vehicle to give a warning signal indicating improper operation of the lateral control of the trainer and a second signal system operative in response to the movement of the power actuated means for simulating a change in the angle of the longitudinal axis of an airplane relative to the horizon a predetermined amount from a neutral position.

8. In an aviation ground training device of the character including a means forming a cockpit inclosure for the student being instructed, power actuated means for causing said cockpit inclosure to simulate the banking or lateral tilting of an airplane, power actuated means for causing said cockpit inclosure to simulate the changing attitude of the longitudinal axis of an airplane with respect to the horizontal, an airplane-type control column mounted within said cockpit inclosure and movable to simulate the lateral and longitudinal control movements of an airplane control, an operative connection between each of said power actuated means and said control column whereby each of said means is controlled respectively by the lateral and longitudinal movement of said control column, damping means associated with said control column effective to cause a resisting force on said column proportional to the rate of deflection thereof either laterally or longitudinally from a neutral position, and means for rendering said damping means ineffective to cause a resistance to the movement of said control column in either plane of its movement when said second named power actuated means has caused said cockpit inclosure to simulate a predetermined attitude of the longitudinal axis of an airplane from a neutral or level position.

9. The structure as claimed in claim 8, in which there is provided a signal means operable by the said means for rendering the damping means ineffective to give a warning signal concurrent with the release of the restraining force of said damping means on the control column.

10. In an aviation ground trainer of the character described having a control column movable in a manner equivalent to the lateral and longitudinal control movement of an airplane control, means yieldingly resisting the movement of said control means in direction of control movement proportional to the rate of movement of said control column from a neutral position and means for rendering said yielding means ineffective upon a movement of said control column in one direction.

11. The structure as claimed in claim 10, in which there is provided a signal means operatively controlled by the said means for rendering the yielding means ineffective and operable to give a signal upon the release of the restraining forces opposing movement of the control column.

12. A power propelled vehicle for use in training students in the art of controlling an airplane including at least one steerable wheel for directionally controlling the vehicle, engine driven propelling means for the vehicle, means forming a cockpit inclosure for the student receiving training, said cockpit inclosure being pivotally mounted for tilting about an axis parallel with the longitudinal axis of the vehicle, a power take-off from said engine driven propelling means, reversible servo mechanism actuated from said power take-off and including a control element shiftable in either direction from a neutral position to cause forward and reverse operation respectively of said servo mechanism at a rate proportional to the deflection of said element from the neutral position, and an operative connection between said servo mechanism and said cockpit inclosure whereby said inclosure is tilted laterally from a level position in either direction dependent upon the direction of operation of said servo mechanism, and an airplane-type control column mounted in said cockpit inclosure and operatively connected to said servo mechanism control element to actuate the same.

13. A power propelled vehicle for use in training students in the art of controlling an airplane including means actuated by the student for directionally controlling the vehicle, means forming a cockpit inclosure for the student occupant of the vehicle, means forming a front cowl section of said cockpit inclosure and shiftable above and below a neutral position which intersects the line of sight from the student's eyes to the visible horizon to simulate the various attitudes of the longitudinal axis of an airplane with respect to the horizontal, a power actuated reversible servo-motor having a control element shiftable in either direction from a neutral position to cause operation of said servo-motor in the forward or reverse direction respectively at a rate proportional to the deflection of said control element from the neutral position, an operative connection between said servo-motor and the said shiftable cowl section to shift the same in either direction from its neutral position, an airplane-type control means mounted in said cockpit inclosure and manually movable in either direction from a neutral position to simulate the control of the elevators of an airplane, and an operative connection between said airplane-type control means and said servo-motor control element whereby manual actuation of said control means in either direction from the neutral position causes a corresponding proportional shifting of the said servo-motor control element.

14. The structure as claimed in claim 13, in which there is provided an electric solenoid controlled dashpot connected to said airplane-type control means to normally impose a resisting force to the movement thereof proportional to the rate at which it is deflected in either direction from the neutral position, and said solenoid control being adapted to be energized to release the restraint imposed upon said control means by the dashpot upon a movement of said shiftable cowl section beyond a predetermined point in one direction of the movement thereof from the neutral position.

15. The structure as claimed in claim 13, in which there is provided an electric solenoid controlled dashpot connected to said airplane-type control means to normally impose a resisting force to the movement thereof proportional to the rate of movement of said control means, an electric signal means electrically connected in series with the solenoid of said dashpot, and means responsive to a movement of said shiftable cowl section beyond a predetermined point in one direction from the neutral position to cause said signal means and said dashpot solenoid to become energized, whereby said signal means gives a warning signal and said solenoid renders said dashpot ineffective to impose resisting forces to the movement of the said control means.

16. The structure as claimed in claim 13, including a gun mounted on said shiftable cowl section and movable therewith, said gun being of a type such that operation of the trigger mechanism thereof causes said gun to fire a number of times in succession, and means mounted on said airplane-type control means for remotely actuating the trigger mechanism of the gun.

17. An aviation ground trainer comprising a power propelled steerable wheeled vehicle having means thereon forming a cockpit inclosure for the student receiving instruction, reversible power actuated means for causing said cockpit inclosure to simulate the banking of an airplane, reversible power actuated means for causing said cockpit inclosure to simulate the level flight, climbing or descending attitudes of an airplane, manually actuated airplane-type controls mounted within said cockpit inclosure and including rudder controls operatively connected to the vehicle steering means to directionally control the same and a control column capable of lateral and longitudinal control movement in either direction from a neutral position and connected to said power actuated means to respectively control the same to operate at a rate and in a respective direction dependent upon the displacement of said control column from its neutral position.

18. The structure as claimed in claim 17, in which said control column has connected therewith a pair of resilient elements each selectively operative to impose a force on said control column when in the neutral position equivalent to the force felt on the control column of an airplane in a corresponding position due to tail or nose-heavy conditions and manual control means within said cockpit inclosure operative to cause either of said resilient elements to impose a desired loading on said control column.

19. The structure as claimed in claim 17, in which said cockpit inclosure is provided with movable means adapted to control the power output of the vehicle propelling power plant, a resilient element connected to said control column and to said movable means such that the resilient element imposes a predetermined loading force on said control column when said movable means is in the minimum power output control position.

WILLIAM C. OCKER.
CARL J. CRANE.